United States Patent [19]
Ginsberg et al.

[11] 3,867,684
[45] Feb. 18, 1975

[54] PULSE FORMING NETWORK CHARGING CONTROL SYSTEM

[75] Inventors: Howard S. Ginsberg, Baltimore, Md.; Charles K. Hooper, Inverness, Fla.

[73] Assignee: Westinghouse Electric Corporation, Pittsburgh, Pa.

[22] Filed: Sept. 7, 1973

[21] Appl. No.: 395,315

[52] U.S. Cl. ............... 321/19, 307/246, 328/67
[51] Int. Cl. ................... H03k 3/64, H02p 13/22
[58] Field of Search ........ 307/106, 108, 246; 320/1; 321/5, 18, 19; 328/67

[56] References Cited
UNITED STATES PATENTS

| | | | |
|---|---|---|---|
| 3,065,399 | 11/1962 | McNamee | 321/18 |
| 3,119,968 | 1/1964 | Schonberg | 328/67 |
| 3,139,585 | 6/1964 | Ross et al. | 328/67 |
| 3,452,266 | 6/1969 | Borden et al. | 321/45 X |
| 3,514,689 | 5/1970 | Giannamore | 321/5 |
| 3,541,421 | 11/1970 | Buchman | 321/18 X |
| 3,551,786 | 12/1970 | Gulik | 321/18 X |
| 3,621,274 | 11/1971 | Plond | 307/106 |
| 3,774,054 | 11/1973 | Morse | 328/67 |

*Primary Examiner*—William H. Beha, Jr.
*Attorney, Agent, or Firm*—R. M. Trepp

[57] ABSTRACT

A pulse forming network (PFN) charge control system for controlling the DC supply voltage applied to a resonant charging system in a line type modulator. The circuitry utilized measures and computes the total energy stored at any instant supplied from the DC supply. When this energy reaches a predetermined value, the circuitry operates to block further flow of energy from the AC line source which powers the DC supply.

10 Claims, 2 Drawing Figures

3,867,684

PULSE FORMING NETWORK CHARGING CONTROL SYSTEM

BACKGROUND OF THE INVENTION

1. Field of the Invention

The present invention relates generally to electronic control circuitry and more particularly to means for controlling the charging of a pulse forming network in a line type modulator commonly used in pulsed radar systems for triggering an RF generator.

2. Description of the Prior Art

Control or adjustment of the voltage on pulse forming networks commonly used in pulsed radar systems is presently accomplished by several different means. One means of control is by the adjustment of the primary AC voltage. Another is reducing the Q or "de-Q-ing" of the resonant charge circuit. Still other means comprises shunt regulation of the pulse forming network voltage or series regulation of the resonant charge DC supply. Additionally, the concept of the step charging in which energy is tranferred from a small reactor to the pulse forming networks in a series of high frequency pulses has also been utilized.

SUMMARY

Briefly, the subject invention comprises a closed loop feedback control circuit for controlling the energy supplied to a pulse forming network (PFN) of a line type modulator. It includes means for measuring the instantaneous charging current and voltage and computing a signal which is proportional to the energy stored in the PFN. The stored energy signal is compared against a predetermined reference signal in a comparator circuit which provides an output used to control the primary current of an AC power transformer whose secondary voltage is rectified and applied as a DC supply voltage to the PFN for charging the network to a predetermined level.

DESCRIPTION OF THE PREFERRED EMBODIMENTS

Figure 1:
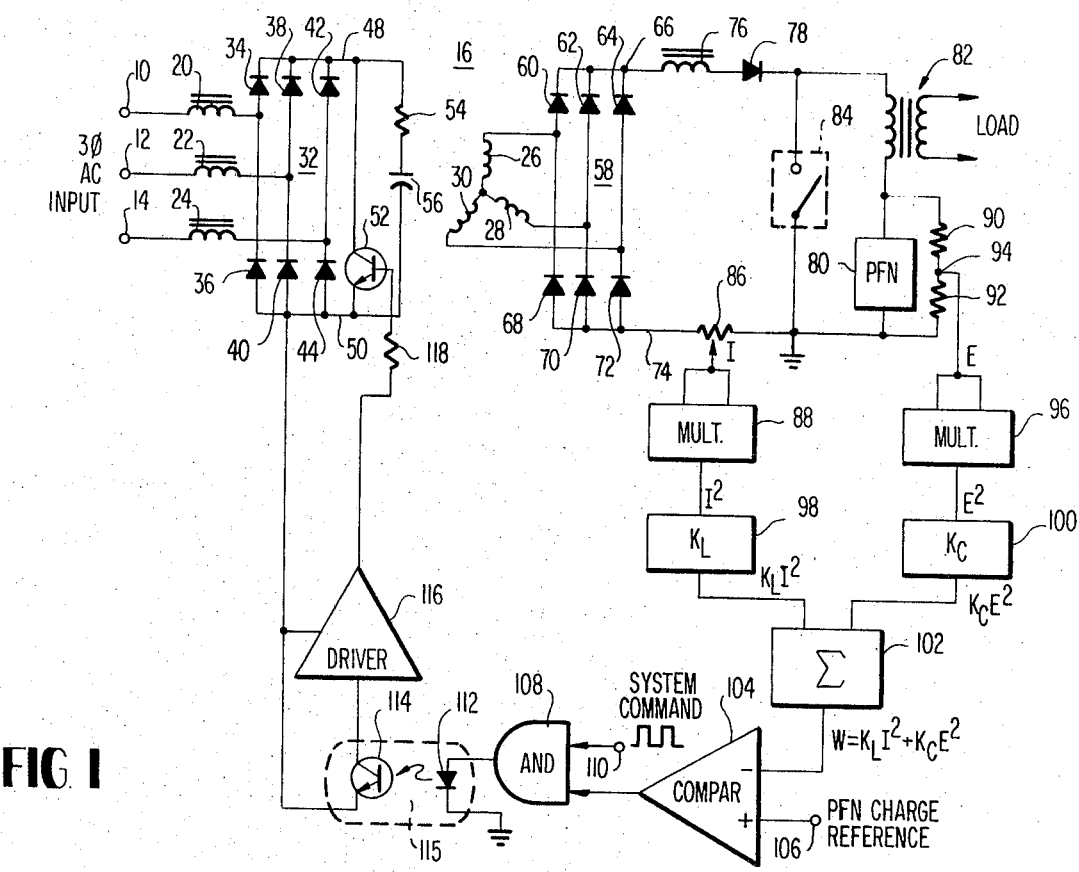
FIG. 1 is a schematic diagram partly in block diagrammatic form illustrative of a first embodiment of the subject invention.

Referring now to the drawings wherein like reference numerals refer to like elements throughout, attention is first directed to FIG. 1 wherein reference numerals 10, 12 and 14 denote three AC power input terminals to which is applied a three phase AC line voltage. A three phase power transformer 16 connected to terminals 10, 12 and 14 includes a primary circuit comprised of three open Y windings 20, 22 and 24 and a Y connected secondary circuit comprised of windings 26, 28 and 30. A three phase diode bridge circuit 32 is coupled to the primary windings 20, 22 and 24. More particularly, one end of the winding 20 is commonly connected to the diodes 34 and 36, the winding 22 is connected to diodes 38 and 40 while winding 24 is connected to diodes 42 and 44. The diodes 34, 38 and 42 have a common circuit connection 48 while diodes 36, 40 and 44 have a common circuit connection 50. A transistor 52 has its emitter and collector coupled across the circuit connections 48 and 50 together with a series connected resistor 54 and a capacitor 56 which acts to suppress switching transients.

The power transformer configuration shown in FIG. 1 comprises a supply whose voltage output appearing across the secondary windings 26, 28 and 30 is commonly controlled by means of the conductive state of the transistor 52 which is adapted to operate either as an ON/OFF switch in a manner taught for example in U.S. Pat. No. 3,514,689 issued to R. Giannoamore. The control is thus obtained from the primary or AC side of the three phase power transformer 16 due to transistor 52 either permitting or blocking primary current flow and accordingly the $Ldi/dt$ voltaage induced in the secondary windings 26, 28 and 30.

A three phase full-wave diode rectifier circuit 58 including the diodes 60, 62 and 64 having a common connection 66 and three diodes 68, 70 and 72 having a common connection 74 is connected to the secondary windings 26, 28 and 30, thereby providing DC supply across common connections 66 and 74. A line type modulator is coupled across the output of the three phase rectifier 58 at the connections 66 and 74 and comprises a resonant charging choke 76, a blocking diode 78 connected in series with the choke 76, a pulse forming netowrk (PFN) 80 connected in series to an output pulse transformer 82 and a suitable triggered electron switch 84 which may be comprised of for example a thyratron or some type of solid state switch such as an SCR, RSR or thyristor. The switch is normally open and connected across the PFN 80 and the output pulse transformer 82 connected between the cathode side of the blocking diode 78 and a point of reference potential illustrated as ground.

The inventive concept of the subject invention concerns itself with additionally including a charging current sensor and a voltage sensor for determining the electrical energy contained in the modulator circuitry and accordingly controlling the amount of power applied thereto by means of the action of transistor 52 coupled across the diode bridge 32 in the primary circuit of the AC power transformer 16. To this end the first embodiment of the subject invention shown in FIG. 1 includes a resistance potentiometer 86 connected between the circuit connection 74 and ground for providing a current sensor. The slider element of the potentiometer 86 yields a voltage proportional to the PFN charging current. This voltage is commonly fed to the two inputs of a mulitplier circuit 88 which in turn provides an output signal proportional to the square of the current or $I^2$.

A voltage divider comprised of two fixed resistors 90 and 92 are coupled across the pulse forming network 80 to provide a voltage at circuit junction 94 which is proportional to the voltage across the PFN. The voltage appearing at circuit junction 94 is commonly applied to the two imputs of a second multiplier curcuit 96 which provides an output of the square of the voltage or $E^2$. Two scaling circuits 98 and 100 are respectively coupled to the multipliers 88 and 96 with the first scaling circuit 98 mulitplying the $I^2$ signal by an inductance coefficient factor $K_L$ providing a signal $K_2I^2$ which is proportional to the energy stored in the charging inductor 76 while the second scaling circuit 100 multiplies the signal $E^2$ by a capacitance coefficient factor $K_C$ providing an output signal $K_C E^2$ which is proportional to the energy stored in the capacitance of the PFN 80. In order for the above relationship to hold, $K_L$ and $K_C$ are made to be ½L and ½C where L and C are the inductance of the charging choke 76 and capacitance of the PFN 80, respectively. The outputs of the scaling circuits 98 and 100 are fed to a summing circuit 102 which provides an output signal W which is proportional to the sum of the energy stored in the charging inductor 76 plus that stored in the capacitance of the PFN 80, i.e., $W = K_L I^2 \; 30 \; K_C E^2$.

The output signal W from the summing circuit 102 is fed to a comparator circuit 104 which has its other input coupled to terminal 106 to which is applied a charging level reference voltage. The output of the comparator 104 comprises a binary type signal applied to one input of a logic AND gate 108 which has its other input coupled to terminal 110 to which is applied a binary type system command signal from a source not shown. The output of the AND gate 108 is coupled to a photo emitting diode 112 which is coupled to a photo-responsive transistor 114 by means of an optical coupler 115. The transistor 114 is coupled across a floating, i.e. underground driver circuit 116 whose output is connected back to the base of the control transistor 52 by means of the resistor 118.

Considering now the operation of the embodiment shown in FIG. 1, with the pulse forming network 80 discharged, the output of the comparator circuit 104 is of an amplitude defined as a binary logic "1" or high state. upon the application of a system command input signal also in the form of a binary "1" or high signal, the output of the AND gate 108 then goes to a logic "1" or high state, whereupon a current is applied to the photo emitting diode 112 which generates an optical signal. This signal is coupled to the phototransistor 114 causing it to conduct. The conduction of the transistor 114 activates the driver circuit 116 which in turn couples a turn-on signal to the transistor 52 which has previously been rendered non-conductive, i.e. OFF. Conduction of the transistor 52 permits AC power to be induced in the secondary windings 26, 28 and 30 which is then rectified and applied to the modulator circuitry. Resonant charging of the PFN 80 is thus initiated through the charging choke 76. As the resonant charging proceeds, the current sensor potentiometer 86 and the voltage divider resistors 90 and 92 continuously provide signal respectively corresponding to the charging current and the PFN voltage. When the output of the summing circuit 102 exceeds a predetermined level as determined by reference voltage applied to terminal 106, the comparator circuit 104 changes to a binary "0" or low logic state at which time the output of the AND gate 108 also goes to a logic "0." Current is removed from the light emitting diode 112 which then acts to cause transistor 52 to again become non-conductive i.e. turn "OFF" by action of the transistor 114 and the driver circuit 116. The non-conductance of transistor 52 now blocks current flow in the primary windings 20, 22 and 24 and thus terminates further input power transfer to the line modulator circuitry. At this point the residual energy that exists in the charging choke 76 is transferred to the capacitance of the PFN 80, except for incidental losses, by means of free wheeling action through the three phase rectifier diodes 60, 62, 64 and 68, 70 and 72 in a well known manner. The blocking diode 78 prevents energy supplied to the PFN 80 from discharging back through the inductance of the choke 76.

The voltage $E_{pfn}$ across the pulse forming network 80 is now related to the total energy $W_T$ stored in the system which can be expressed as follows: $½ C (E_{pfn})^2 = W_T$ where C is the PFN capacitance. By setting the reference voltage applied to terminal 106 to a predetermined value, the capacitance in the PFN 80 can be charged to a controlled voltage in which the energy existing in the charging choke 76 at the time of the system command signal is applied is accounted for.

With the pulse forming network 80 charged, the comparator circuit 104 is adapted to maintain its "0" logic state until the system command signal applied to the AND gate 108 again goes low. This acts to keep the control transistor 52 non-conduction. The modulator switch 84 is then activated or "closed," causing the PFN 80 to discharge therethrough which in turn causes a relatively high power output pulse to appear across the secondary winding of the pulse transformer 82 for triggering an RF generator such as a magnetron or the like, not shown. The discharge of PFN 80 causes the input signal to the comparator 104 to be such that it reverts to a logic "1" state.

The next or succeeding charge cycle will begin with the occurrence of the next logic "1" system command signal applied to the AND gate 108. The AND gate 108 is required in conjunction with the system command signal to prevent a turn-on of the controlled transistor 52 when the PFN switch 84 closes causing the PFN 80 to discharge. It also allows sufficient time for the electronic switch 84 to regain its forward blocking characteristics before the next charge cycle begins. The optical coupling is required for isolation since the three phase neutral is normally grounded and therefore the drive signal to the base of transistor 52 must be at a floating potential.

Figure 2:
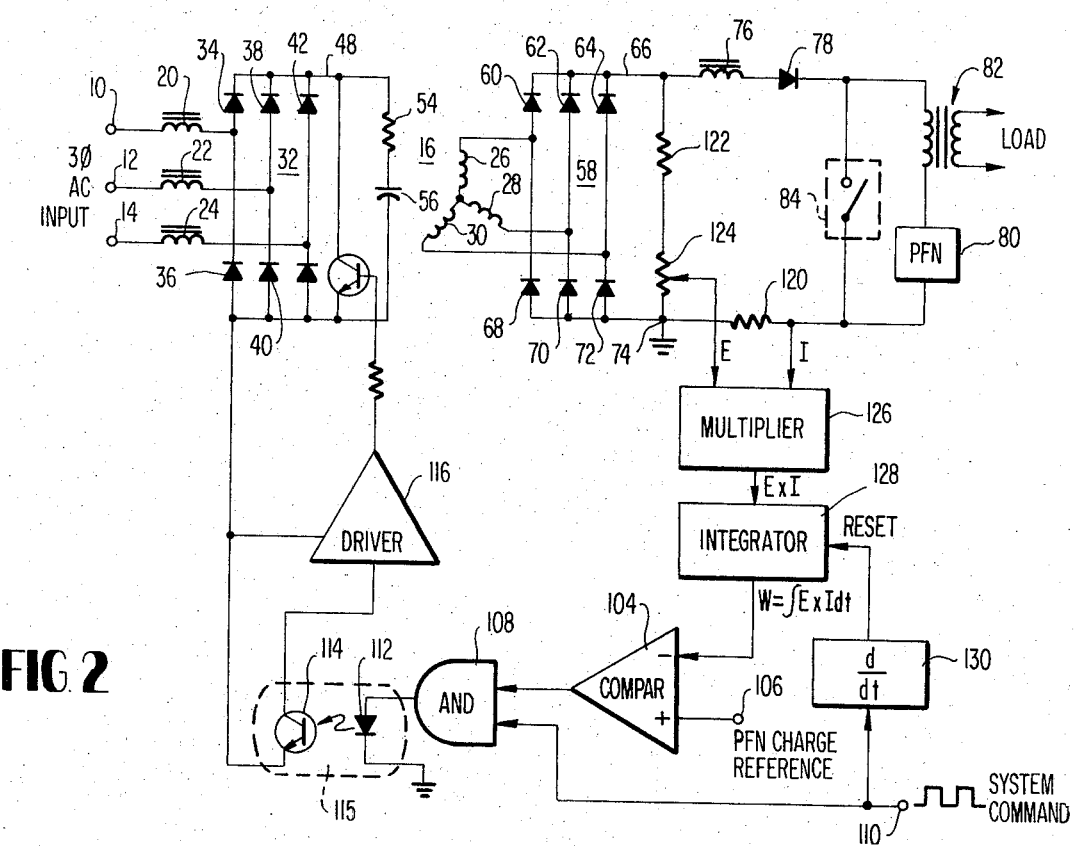
FIG. 2 is an electrical schematic diagram partly in block diagrammatic form illustrative of a second embodiment of the subject invention.

A modification or second embodiment is shown in FIG. 2 and is substantially identical to the embodiment shown in FIG. 1 except for the manner in which the energy signal W fed to the comparator circuit 104 is computed. Instead of computing the energy in the charging choke 76 and the PFN 80 separately and then summing them as previously discussed, the embodiment shown in FIG. 2 is adapted to compute the charging energy coming directly from the output of the three phase bridge rectifier 58. The charging current sensor is now provided by means of a ground return resistor 120 commonly coupled from a ground side of the PFN 80 to ground while the voltage sensor comprises a voltage divider network comprising a fixed resistor 122 and a resistance potentiometer 124 coupled in series across the output of the three phase rectifier 58 i.e. between common connection 66 and ground or common connection 74. The voltages corresponding to the charging current I and the PFN voltage E is respectively applied to two imputs of a multiplier circuit 126 which provides an output signal E I which is then applied to an integrator circuit 128 having, for example, a Miller integrating capacitor, not shown, which acts to integrate the current and voltage signals over the charging period to provide a signal W which is directly proportional to the total charging energy which and as noted above is equivalent to the energy in the charging choke 76 plus the energy in the PFN 80 plus negligible energy losses. The integrator circuit 128, however, must be reset after each charge cycle. This is accomplished by means of the differentiator circuit 130 coupled between the terminal 110 to which is applied a charge command signal and the integrator circuit. Differentiating the binary type system command signal provides a positive leading edge pulse which is adapted to discharge the Miller integrating capacitor contained in the integrator circuit 128. In all other respects the operation is as previously described with respect to the embodiment shown in FIG. 1.

It should be pointed out that the PFN voltage can be programmed to have for example a "ramp" start or any other desired voltage change by suitably programming the reference voltage applied to the comparator circuit 104 at terminal 106. In the case of staggered pulses for use in pulsed radar systems, the PFN voltage can vary in specified amounts during the various intervals of charge and firing. If the pulse stagger is programmed so that the succeeding delay time is known, the reference can slso be programmed to account for the required variations.

The following advantages result from the energy controlled PFN charging system as shown and described in FIGS. 1 and 2. First of all, high efficiency is obtained since no supplementary losses occur as in conventional "de-Q-ing" systems or in dissipative control systems such as series or shunt regulation. The accuracy of the system, moreover, is increased since the total stored energies are at all times measured and accounted for with the final output voltage being correctly predicted at the time of AC line power cut-off. Low switching losses occur since the controlled transistor 52 is operated in a binary mode such that it is fully conductive, that is ON in a saturated state during all of the charging period. It then switches to a non-conductive or OFF state whereby all current flow is prevented in the primary circuit of the transformer. All of the switching and control is accomplished at relatively low voltage levels in comparison to the voltages occurring in the modulator circuitry including the pulse forming network. Since only one switching operation is required per charge cycle, there is little if any tendency to hunt or oscillate. Finally, it is theoretically possible that the input voltage occurring across the pulse forming network can be adjusted from zero to full voltage at relatively high efficiency.

Having thus described what is at present considered to be the preferred embodiments of the subject invention, we claim:

1. Means for controlling the energy supplied to a pulse forming network in a line type modulator having a resonant charging system, comprising:
    a controlled source of charging current coupled to said line type modulator for supplying a charging current thereto to charge said pulse forming network;
    control means coupled to said controlled source for controlling the electrical energy supplied to said line type modulator;
    first circuit means coupled to said line type modulator and being operable to provide a signal proportional to the electrical energy stored in said line type modulator; and
    second circuit means coupled to said first circuit means and being responsive to said signal proportional to said stored energy and being operable to generate a control signal, said control signal being coupled to said control means, said control signal operating said control means during a charging mode of operation to render said controlled source operative and couple charging current to said line type modulator when said signal proportional to the stored energy in said line type modulator is below a predetermined value and operating said control means during a second mode of operation to render said controlled source inoperative and thereby interrupt charge current flow when said stored energy reaches a predetermined value.

2. The means as defined by claim 1 wherein said controlled source comprises a DC supply powered from an AC line source and wherein said control means comprises means controlling the AC power coupled to said DC supply source.

3. The means as defined by claim 2 wherein said DC supply comprises:
    transformer means having a primary circuit and a secondary circuit;
    rectifier circuit means coupled to said secondary circuit for providing a DC charging current to said line type modulator; and
    wherein said control means comprises a control element coupled to the primary circuit for controlling the current in said primary circuit.

4. The means as defined by claim 3 wherein said second circuit means includes:
    comparator circuit means having at least two inputs with one of said two inputs coupled to said first circuit means and being responsive to said signal proportional to the energy stored in said line type modulator and another input of said two inputs coupled to a reference voltage having an amplitude corresponding to a desired energy charge of said line type modulator and providing a first type output signal when said energy stored is below a predetermined value and a second type output signal when said energy stored is substantially equal to or exceeds said predetermined value; and
    third circuit means coupled to and responsive to said first and second type output signals from said comparator circuit and being operable to generate said control signal coupled to said control means.

5. The means as defined by claim 4 wherein said first circuit means comprises:
    current sensor means coupled in said line type modulator for providing an output signal proportional to the charging current of said resonant charging system;
    voltage sensor means coupled in said line type modulator providing a signal proportional to the voltage across said pulse forming network;
    first and second squaring circuit means respectively coupled to said current and voltage sensor means for providing a respective signal proportional to the square of the current and voltage;
    first and second multiplier circuit means respectively coupled to said first and second squaring circuit for respectively multiplying the squared current and voltage signals by a predetermined factor dependent on the inductance of the resonant charging system and the capacitance of the pulse forming network; and
    a summing circuit coupled to said multiplier circuit means providing a signal to said comparator circuit means proportional to the energy stored in said line type modulator.

6. The means as defined by claim 5 wherein said third circuit means includes:
binary logic circuit means coupled to said comparator circuit means and being responsive to said first and second type output signals from said comparator circuit means for generating binary output signals; and
fourth circuit means coupled to said logic circuit means and being operable to generate and couple said control signal to said control means.

7. The means as defined by claim 6 wherein said logic circuit means comprises:
a two input AND logic gate having one input coupled to the output of said comparator circuit and the other input coupled to a system command signal;
wherein said fourth circuit means comprises optical signal translation means coupled to the output of said AND gate and being operated thereby and an isolated drive circuit coupled to said optical signal translation means and being operable to couple said control signal to said control means; and
wherein said control means comprises a transistor adapted to alternately pass and block AC current in said primary circuit.

8. The control circuit as defined by claim 4 wherein said second circuit means comprises:
current sensor means in said line type modulator providing a signal proportional to the charging current of said line type modulator;
voltage sensor means in said line type modulator providing a signal proportional to the voltage coupled to said line type modulator from said DC supply source;
multiplier circuit means coupled to said current and voltage sensor means for providing a signal proportional to the product of said charging current and voltage coupled from said DC supply source;
an integrator circuit coupled to the output of said multiplier and being operable over the charging period of said pulse forming network to provide a signal output which is proportional to the energy charge of said pulse forming network, said signal output being coupled to said comparator circuit; and
integrator circuit reset means coupled to said integrator circuit for resetting the integrator circuit after each charge cycle of said pulse forming network.

9. The means as defined by claim 8 wherein said third circuit means includes:
binary logic circuit means coupled to said comparator circuit means and being responsive to said first and second type output signals from said comparator circuit means for generating binary output signals; and
fourth circuit means coupled to said logic circuit means and being operable to generate and couple said control signal to said control means.

10. The means as defined by claim 9 wherein said logic circuit means comprises:
a two input AND logic gate having one input coupled to the output of said comparator circuit and the other input coupled to a system command signal;
wherein said fourth circuit means comprises optical signal translation means coupled to the output of said AND gate and being operated thereby and an isolated drive circuit coupled to said optical signal translation means and being operable to couple said control signal to said control means; and
wherein said control means comprises a transistor adapted to alternately pass and block AC current in said primary circuit.

* * * * *